No. 882,389. PATENTED MAR. 17, 1908.
C. L. HINE.
NUT LOCK.
APPLICATION FILED JULY 16, 1907.
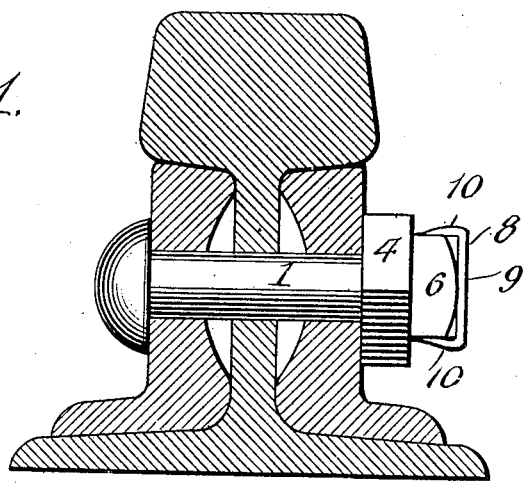
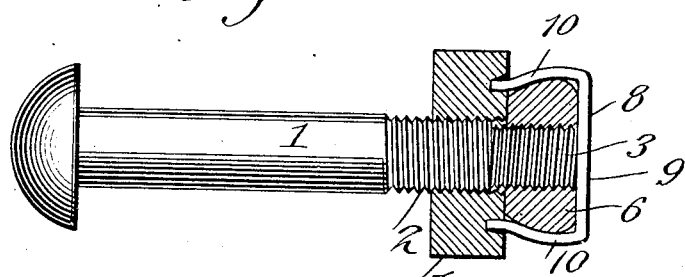
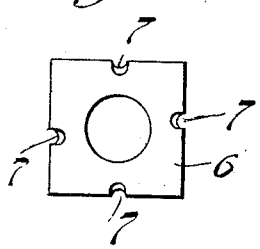 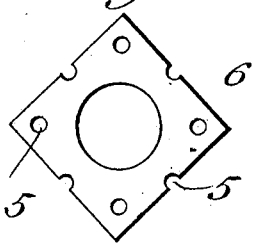
Witnesses
Inventor
Clyde L. Hine
By Victor J. Evans
Attorney

UNITED STATES PATENT OFFICE.

CLYDE L. HINE, OF TUSCOLA, ILLINOIS.

NUT-LOCK.

No. 882,389. Specification of Letters Patent. Patented March 17, 1908.

Application filed July 16, 1907. Serial No. 384,004.

*To all whom it may concern:*

Be it known that I, CLYDE L. HINE, a citizen of the United States, residing at Tuscola, in the county of Douglas and State of Illinois, have invented new and useful Improvements in Nut-Locks, of which the following is a specification.

This invention is an improved nut-lock adapted for use in locking the nuts of bolts employed in rail joints and also adapted for use in other connections, and the said invention consists in the construction, combination and arrangement of devices hereinafter described and claimed.

In the accompanying drawing, Figure 1 is a transverse sectional view of a railway joint provided with a bolt equipped with my improved nut locking device. Fig. 2 is a detail sectional view of my improved nut locking device, showing the same on a bolt, the latter being indicated in elevation. Fig. 3 is a detail elevation of the locking nut and, Fig. 4 is a similar view of the main nut.

In accordance with my invention, the bolt 1 which has the screw threaded portion 2, is also provided with an extension 3 of its stem which is of less diameter than the stem and is oppositely screw threaded. The main nut 4 is screwed on the threaded portion 2 and is provided in its outer side with openings 5 of suitable depth which are disposed concentrically with reference to the nut and are here shown as near the corners and as midway between the corners of the nut. A locking nut 6 is screwed on the reversely screw threaded stem extension 3 of the bolt and serves to bear against the outer side of the main nut to prevent the casual rotation of the latter, as will be understood. To prevent the locking nut from jarring or working loose and from releasing the main nut, I provide such locking nut with grooves 7 in its sides which are oppositely disposed and which grooves are deeper at the inner side of the locking nut than at the outer side thereof, as shown in Fig. 2. I also provide a key 8 which is made of spring steel or other suitable wire and is bent to form a central portion 9 which is adapted to extend across and lie on the outer side of the locking nut and the reversely curved inwardly converging spring arms 10 which are adapted to engage two of the grooves 7, will, in such grooves and at their inner ends enter two of the openings 5 of the main nut so as to cause such key to lock the locking nut to the main nut. Owing to the fact that the grooves 7 of the locking nut are deepened toward the inner side of such nut and to the fact that the spring arms 10 of the key converge toward the inner side of the locking nut, such spring arms co-act with the bottom walls of such groove to retain the key in place on the locking nut.

Having thus described the invention, what is claimed as new is:—

In combination with a bolt having screw threads on its stem and a reversely screw threaded stem extension, a main nut on said threaded stem provided with openings extending to its outer side and substantially parallel with the axis of the bolt, a locking nut on the reversely threaded stem, of less width than the main nut and having grooves in its sides, the bottoms of such grooves converging toward the inner side of such locking nut and communicating with the openings of the main nut, and a key comprising a central portion bearing on the outer side of the locking nut and inwardly converging spring arms, such spring arms lying in the grooves in the sides of the locking nut, coacting with the bottoms of such grooves to secure such key on such locking nut and having their inner ends inserted in the said openings in the main nut to lock the locking nut to the main nut.

In testimony whereof, I, affix my signature in presence of two witnesses.

CLYDE L. HINE.

Witnesses:
T. H. FERGUSON,
O. B. ATHERTON.